United States Patent
Viswanatha et al.

(10) Patent No.: US 11,796,652 B2
(45) Date of Patent: *Oct. 24, 2023

(54) TECHNIQUES FOR SIGNAL PROCESSING BASED ON SUBBAND TYPING

(71) Applicant: AEVA, INC., Mountain View, CA (US)

(72) Inventors: Kumar Bhargav Viswanatha, Santa Clara, CA (US); Jose Krause Perin, Mountain View, CA (US); Rajendra Tushar Moorti, Mountain View, CA (US); Mina Rezk, Haymarket, VA (US)

(73) Assignee: Aeva, Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/854,798

(22) Filed: Jun. 30, 2022

(65) Prior Publication Data

US 2022/0334235 A1    Oct. 20, 2022

Related U.S. Application Data

(63) Continuation of application No. 17/337,136, filed on Jun. 2, 2021, now Pat. No. 11,378,667, which is a
(Continued)

(51) Int. Cl.
*G01S 7/493* (2006.01)
*G01N 29/46* (2006.01)
(Continued)

(52) U.S. Cl.
CPC .............. *G01S 7/493* (2013.01); *G01N 29/46* (2013.01); *G01S 7/4913* (2013.01); *G06F 17/14* (2013.01); *G06F 17/141* (2013.01)

(58) Field of Classification Search
CPC ...... G01S 7/493; G01S 7/4913; G01S 17/931; G01S 17/42; G01S 17/89; G01S 17/34; G01N 29/46; G06F 17/141
(Continued)

(56) References Cited

U.S. PATENT DOCUMENTS 10,003,423 B2    6/2018   Yu et al.
10,634,793 B1    4/2020   Siao et al.
(Continued)

FOREIGN PATENT DOCUMENTS

WO    2019/070751 A1    4/2019

OTHER PUBLICATIONS

Transmittal of the International Search Report and Written Opinion of the International Searching Authority dated May 17, 2021, for International Application No. PCT/US2020/048725, filed Aug. 31, 2020, pp. 11.
(Continued)

*Primary Examiner* — Daniel L Murphy
(74) *Attorney, Agent, or Firm* — Womble Bond Dickinson (US) LLP

(57) ABSTRACT

A frequency modulated continuous wave (FMCW) light detection and ranging (LIDAR) system includes a processor and a memory. The memory stores instructions that, when executed by the processor, cause the system to: receive samples of a range-dependent time domain baseband signal; assemble the samples into sample blocks in the time domain; convert the sample blocks from the time domain to the frequency domain; generate subbands in the frequency domain from converted sample blocks; classify the subbands into a plurality of subband types based on subband typing criteria; select subband processing parameters for each of the subbands based on respective ones of the plurality of subband types; and process each of the subbands using the selected subband processing parameters for the subband.

20 Claims, 11 Drawing Sheets

Related U.S. Application Data continuation of application No. 16/999,954, filed on Aug. 21, 2020, now Pat. No. 11,047,963.

(51) Int. Cl.
   *G01S 7/4913* (2020.01)
   *G06F 17/14* (2006.01)

(58) Field of Classification Search
   USPC .......................................................... 702/159
   See application file for complete search history.

(56) References Cited

U.S. PATENT DOCUMENTS

| | | | | |
|---|---|---|---|---|
| 11,047,963 | B1* | 6/2021 | Viswanatha | ............ G06F 17/14 |
| 11,378,667 | B2* | 7/2022 | Viswanatha | ............ G01S 17/42 |
| 2009/0009381 | A1 | 1/2009 | Inaba | |
| 2009/0110033 | A1 | 4/2009 | Shattil | |
| 2014/0118718 | A1 | 5/2014 | Jungwirth | |
| 2015/0378187 | A1 | 12/2015 | Heck et al. | |
| 2016/0352543 | A1 | 12/2016 | Hu et al. | |
| 2017/0016983 | A1 | 1/2017 | Hoshuyama | |
| 2018/0284237 | A1 | 10/2018 | Campbell et al. | |
| 2019/0154439 | A1 | 5/2019 | Binder | |
| 2019/0302269 | A1 | 10/2019 | Singer et al. | |
| 2020/0292680 | A1 | 9/2020 | Coda | |
| 2021/0011155 | A1 | 1/2021 | Suzuki et al. | |
| 2021/0026018 | A1 | 1/2021 | Kern et al. | |

OTHER PUBLICATIONS

Al-Qudsi, B. (2013). "Zoom 111 for Precise Spectrum Calculation in FMCW Radar using FPGA," PRIME Session W3B Singal Processing 2, pp. 337-340.

* cited by examiner

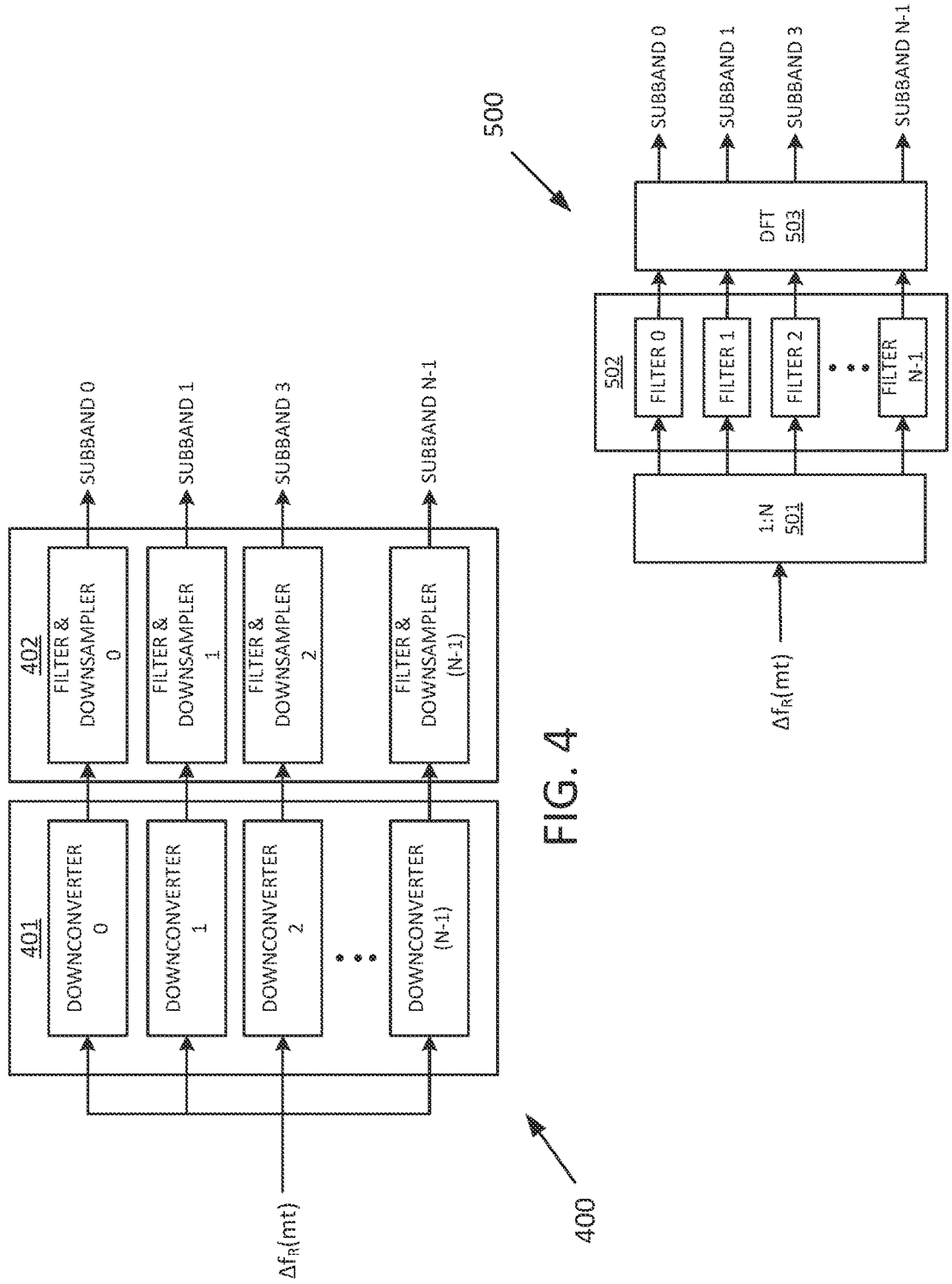

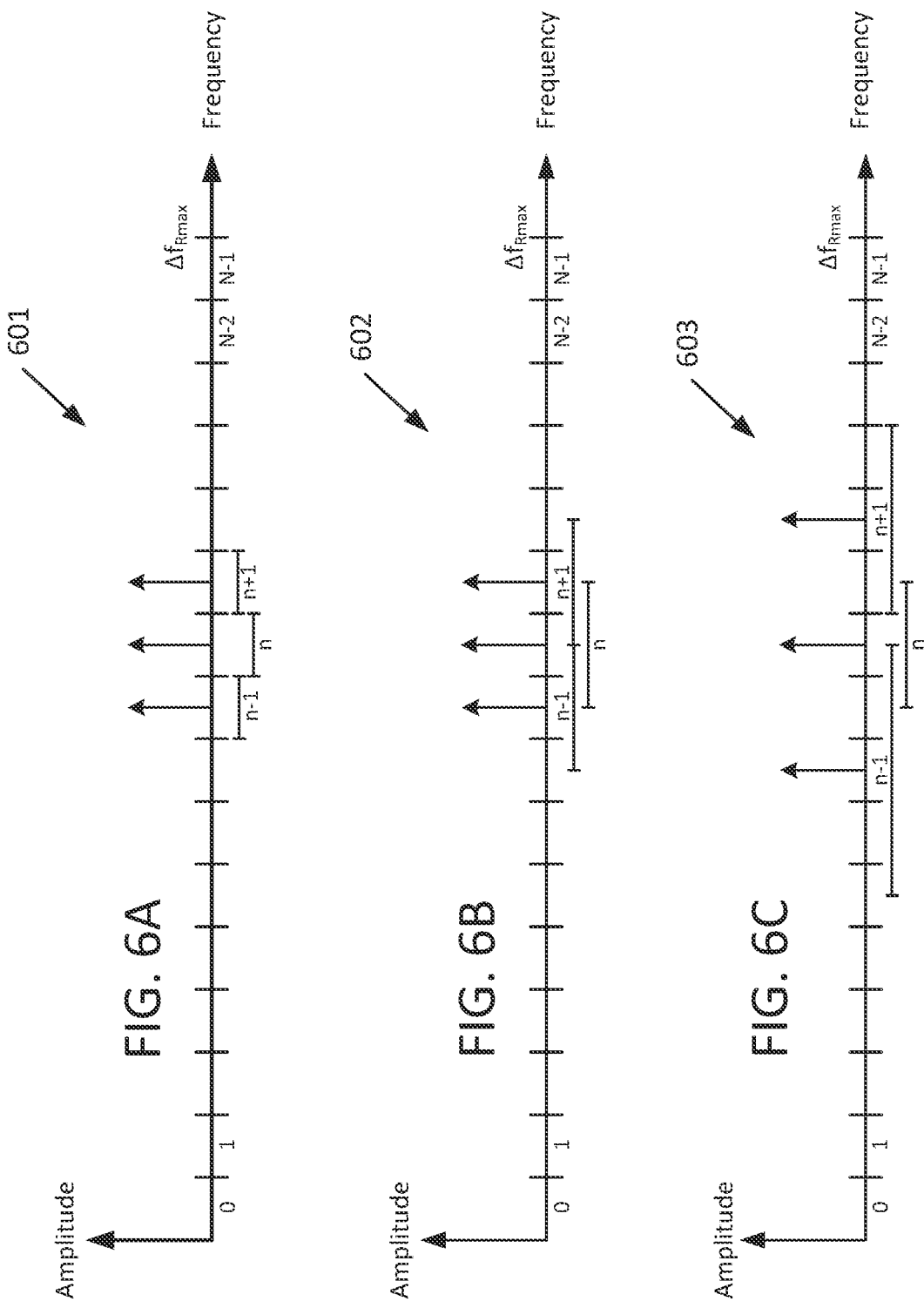

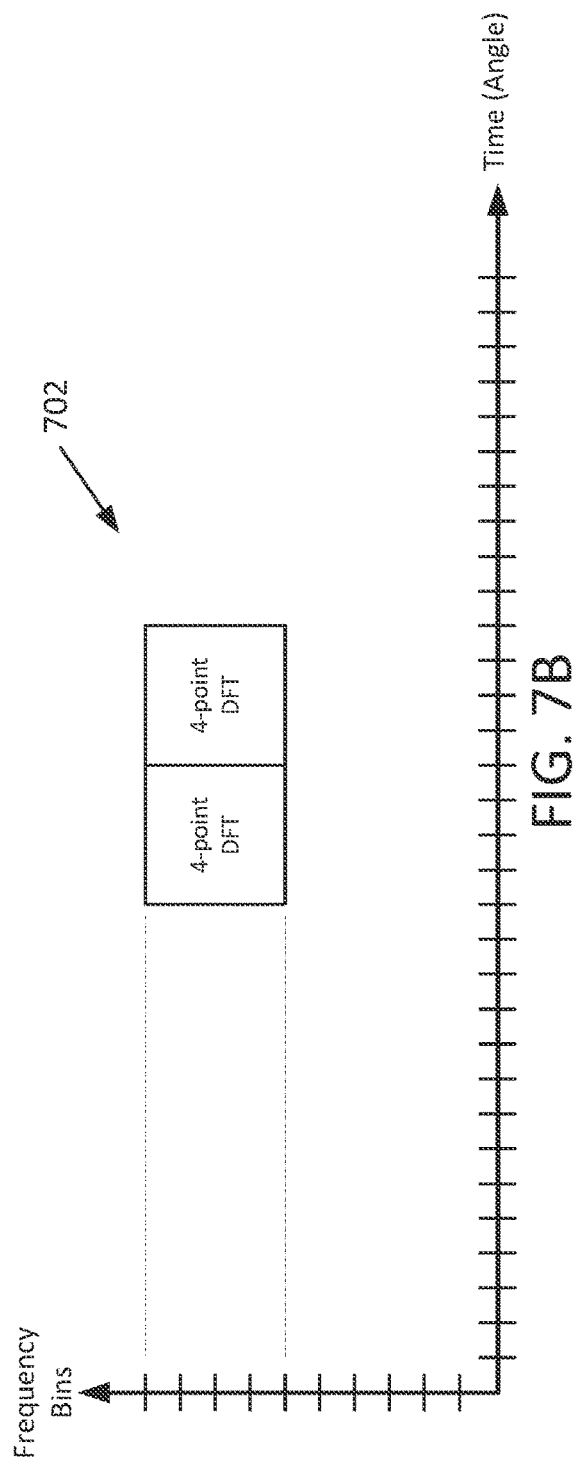
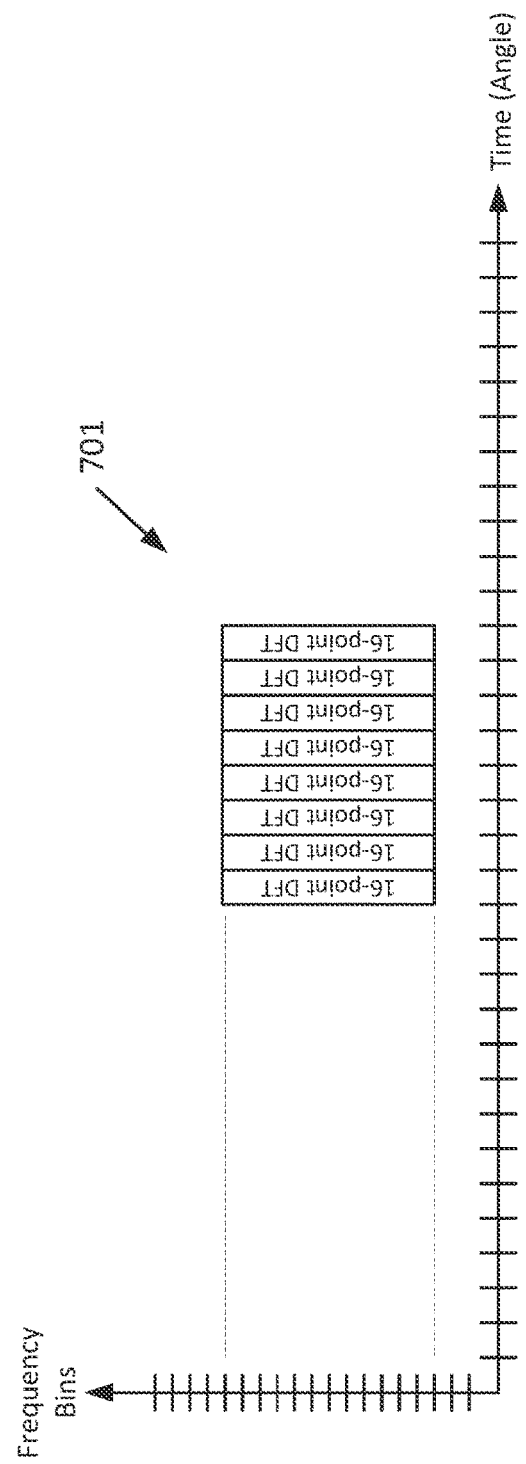
FIG. 7B
FIG. 7A

TECHNIQUES FOR SIGNAL PROCESSING BASED ON SUBBAND TYPING

CROSS-REFERENCE TO RELATED APPLICATIONS

This application is a continuation of U.S. patent application Ser. No. 17/337,136, filed on Jun. 2, 2022, which is a continuation of U.S. patent application Ser. No. 16/999,954, filed on Aug. 21, 2020, the entire contents of each of which are incorporated herein by reference in their entirety.

FIELD

The present disclosure is related to light detection and ranging (LIDAR) systems in general, and more particularly to improving angular resolution and detection sensitivity in LIDAR systems by selectively processing low frequency and high frequency subbands in the time domain and the frequency domain.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal. Mixing the local copy with the return signal, delayed by the round trip time to the target and back, generates a beat frequency at the receiver for each target.

There is a linear relationship between the beat frequency and the range of a given target, so that the target range can be determined by measuring the beat frequency. In general, close range targets generate strong, low beat frequency signals at the receiver, while distant targets generate weaker, higher beat frequency signals at the receiver.

Conventional signal processing methods that increase the probability of detecting weak return signals from distant targets can degrade the measurement of other metrics, such as angular resolution and range resolution, which can decrease reliable detections of close-range targets.

SUMMARY

The present disclosure describes various examples of LIDAR systems and methods for selectively processing subbands in a LIDAR system to achieve a high probability of detection of long range targets while increasing the angular and range resolution of close range targets.

In one example, a frequency modulated continuous wave (FMCW) light detection and ranging (LIDAR) system includes a processor and a memory to store instructions that, when executed by the processor, cause the system to receive samples of a range-dependent time domain baseband signal, separate the samples of the baseband signal into subbands in the time domain with a subband generator, classify the subbands into a plurality of subband types with a subband discriminator based on subband typing criteria, and select subband processing parameters for the subbands in the time domain and the frequency domain based on the plurality of subband types. In one example, a number of subband processors are coupled with the subband generator and the subband discriminator to process the subbands in the time domain and the frequency domain based on the subband processing parameters.

In one example, a bandwidth and center frequency combination of each subband comprises a first subband processing parameter, where the processor causes each of the subband processors to generate a time-domain sample block in a block sampler, where an integration time of the block sampler comprises a second subband processing parameter based on a probability of target detection associated with each subband type, and perform a discrete Fourier transform (DFT) on the time-domain sample block with a DFT processor to generate subbands in the frequency domain, where the length of the DFT comprises a third subband processing parameter based on a range resolution associated with each subband type, and where the periodicity (frequency) of the DFT comprises a fourth subband processing parameter based on an angular resolution associated with each subband type.

In one example, the processor causes each of the subband processors to search for a signal peak, a signal-to-noise ratio (SNR) peak and/or an average SNR above a threshold SNR in each frequency domain subband with a peak search processor. The subband processor also filters each frequency domain subband in a frequency domain processor with a digital filter, where the length of the digital filter comprises a fifth subband processing parameter based on the subband type. In one example, the subband typing criteria are based on one or more of the peak signal energy in a subband, the average signal-to-noise ratio in the subband, and the peak signal-to-noise ratio in the subband. In one example, the subband typing criteria are also based on one or more of scene characteristics, relative target velocity (EGO velocity), azimuth scan angle, elevation scan angle and predicted targets based on previous frames.

In one example, a first type of subband processed by a first type of subband processor comprises subbands containing frequencies less than a first frequency threshold corresponding to a predefined close-range target; a second type of subband processed by a second type of subband processor comprises subbands containing frequencies greater than a second frequency threshold corresponding to a predefined long-range target; and a third type of subband processed by a third type of subband processor comprises subbands containing frequencies between the first frequency threshold and the second frequency threshold corresponding to a predefined medium range-target, where the subband typing criteria comprise the center frequency and bandwidth of the subband.

In one example a fourth type of subband processed by a fourth type of subband processor comprises subbands containing a peak energy greater than a first energy threshold corresponding to a predefined close-range target; a fifth type of subband processed by a fifth type of subband processor comprises subbands containing a peak energy less than a second energy threshold corresponding to a predefined long-range target; and a sixth type of subband processed by a sixth type of subband processor comprises subbands containing a peak energy between the first energy threshold and the second energy threshold corresponding to a predefined medium-range target.

In one example, a seventh type of subband processed by a seventh type of subband processor comprises subbands containing an average SNR greater than a first SNR threshold corresponding to a predefined close-range target; an eighth type of subband processed by an eighth type of subband processor comprises subbands containing an average SNR less than a second SNR threshold corresponding to a predefined long-range target; and a ninth type of subband processed by a ninth type of subband processor comprises subbands containing an average SNR threshold between the first SNR threshold and the second SNR threshold corresponding to a predefined mid-range target.

In one example, a method in a frequency modulated continuous wave (FMCW) light detection and ranging (LIDAR) system includes receiving samples of a range-dependent time domain baseband signal, separating the samples of the baseband signal into subbands in the time domain, classifying the subbands into a plurality of subband types based on subband typing criteria, selecting subband processing parameters for the subbands in the time domain and the frequency domain based on the plurality of subband types, and processing the subbands in the time domain and the frequency domain with the selected subband processing parameters.

In one example, a bandwidth and center frequency combination of each subband comprises a first subband processing parameter, where processing the subbands in the time domain comprises generating a time-domain sample block in a block sampler, where an integration time of the block sampler comprises a second subband processing parameter based on a probability of target detection associated with each subband type, and performing a discrete Fourier transform (DFT) on the time-domain sample block with a DFT processor to generate subbands in the frequency domain, where the length of the DFT comprises a third subband processing parameter based on a range resolution associated with each subband type, and where a periodicity (frequency) of the DFT comprises a fourth subband processing parameter based on an angular resolution associated with each subband type.

In one example, processing the subbands in the frequency domain comprises filtering each frequency domain subband in a frequency domain processor with a digital filter, where the length of the digital filter comprises a fifth subband processing parameter based on the subband type, and searching for a signal peak, a signal-to-noise ratio (SNR) peak or an average SNR greater than a threshold SNR in each frequency domain subband with a peak search processor.

In one example, the subband typing criteria are based on the peak signal energy in a subband, the average signal-to-noise ratio in the subband, and/or the peak signal-to-noise ratio in the subband. In one example, the subband typing criteria are also based on scene characteristics, relative target velocity (EGO velocity), azimuth scan angle, elevation scan angle and predicted targets based on previous frames.

In one example, an FMCW LIDAR system includes a time domain processing subsystem to receive samples of a range-dependent time domain baseband signal in a frequency modulated continuous wave (FMCW) light detection and ranging (LIDAR) system, to pre-condition the samples, and to assemble the pre-conditioned samples into time domain sample blocks. The example system also includes a discrete Fourier transform (DFT) processor, coupled with the time domain processing subsystem, to perform a DFT to convert the time domain sample blocks into frequency domain subbands of the baseband signal. And the example system also includes a frequency domain processing subsystem, coupled with the DFT processor and the time domain processing subsystem, to generate subbands in the frequency domain, to classify the subbands into a plurality of subband types based on subband typing criteria, and to process each subband using subband processing parameters based on a subband type.

In one example, the time domain processing subsystem includes a time domain pre-processor to pre-condition the samples of the range-dependent baseband signal, and a sample block generator coupled with the pre-processor and the frequency domain processing subsystem to assemble the pre-conditioned samples into the time domain sample blocks, where the integration time of the block sampler comprises a first subband processing parameter based on a probability of detection associated with each subband type.

In one example, the length of the DFT comprises a second subband processing parameter based on a range resolution associated with each subband type, and the periodicity (frequency) of the DFT comprises a third subband processing parameter based on an angular resolution associated with each subband type.

In one example, the frequency domain processing subsystem includes a subband generator to generate the subbands in the frequency domain, where the bandwidth and center frequency combination of each subband comprises a fourth subband processing parameter based on target range. In one example, the system also includes a subband discriminator coupled with the subband generator and the sample block generator to classify the subbands by type and to select the subband processing parameters for each subband in the frequency domain based on the subband type. In one example, the system also includes a number of frequency domain processing chains, coupled with the subband generator and the subband discriminator, to condition each subband, to detect signal peaks and signal-to-noise ratio (SNR) peaks and averages in each subband, and to post-process each subband.

In one example, each of the frequency domain processing chains includes a frequency domain processor to filter each subband based on subband type, where the length of a digital filter in the frequency domain processor comprises a fifth subband processing parameter based on the subband type; a peak search processor coupled with the frequency domain processor to selectively search for energy peaks based on the subband type; and a frequency domain post-processor to selectively filter points in a LIDAR point cloud to remove noise.

In one example, the subband typing criteria are based on the peak signal energy in a subband, the average signal-to-noise ratio in the subband, and/or the peak signal-to-noise ratio in the subband. In one example, the subband typing criteria are based on scene characteristics, relative target velocity (EGO velocity), azimuth scan angle, elevation scan angle and predicted targets based on previous frames.

In one example, a method in an FMCW LIDAR system includes receiving, in a time domain processing subsystem, samples of a range-dependent time domain baseband signal; assembling the samples into sample blocks in the time domain with a sample block generator; converting the sample blocks from the time domain to the frequency domain with a discrete Fourier transform (DFT) in a DFT processor; generating subbands in the frequency domain with a subband generator; classifying the subbands with a subband discriminator into a number of subband types based on subband typing criteria; selecting subband processing parameters based on subband type; and processing each frequency subband using the selected subband processing parameters on corresponding subbands.

In one example, an integration time of the block sampler comprises a first subband processing parameter based on a probability of detection associated with each subband type, the length of the DFT comprises a second subband processing parameter based on a range resolution associated with each subband type, the periodicity (frequency) of the DFT comprises a third subband processing parameter based on an angular resolution associated with each subband type, and the bandwidth and center frequency combination of each subband comprises a fourth subband processing parameter.

In one example, processing each frequency subband includes selectively filtering each subband according to subband type, where the length of a digital filter in the frequency domain processor comprises a fifth subband processing parameter based on a bandwidth associated with each subband type; selectively searching for energy peaks in the subband, and peak and average signal-to-noise ratio (SNR) in the subband according to subband type; and selectively filtering points in a LIDAR point cloud to remove noise. In one example, the subband typing criteria are based on the peak signal energy in a subband, the average signal-to-noise ratio in the subband, and the peak signal-to-noise ratio in the subband. In one example, the subband typing criteria are also based on scene characteristics, relative target velocity (EGO velocity), azimuth scan angle, elevation scan angle and predicted targets based on targets detected in previous frames.

BRIEF DESCRIPTION OF THE DRAWINGS

For a more complete understanding of various examples, reference is now made to the following detailed description taken in connection with the accompanying drawings in which like identifiers correspond to like elements:

FIG. 4 is a block diagram illustrating an example of a subband generator in the time domain according to the present disclosure;

FIG. 5 is a block diagram illustrating another example of a subband generator in the time domain according to the present disclosure;

FIGS. 6A-6C are amplitude-frequency diagrams illustrating examples of subband selection according to the present disclosure;

FIG. 7A is a time-amplitude diagram illustrating a type of selective subband signal processing in the time domain for improving the angular resolution of targets according to the present disclosure;

FIG. 7B is a time-amplitude diagram illustrating a type of selective subband signal processing in the time domain for improving target detection probability according to the present disclosure;

DETAILED DESCRIPTION

The present disclosure describes examples of LIDAR systems and methods therein, for range measurement that selectively processes frequency subbands of target return signals, generated in the time domain and/or the frequency domain to increase the probability of detecting distant targets while increasing the angular resolution and range resolution of close range targets. According to some embodiments, the described LIDAR system may be implemented in any sensing market, such as, but not limited to, transportation, manufacturing, metrology, medical, and security systems. According to some embodiments, the described LIDAR system is implemented as part of a front-end of frequency modulated continuous-wave (FMCW) device that assists with spatial awareness for automated driver assist systems, or self-driving vehicles.

Figure 1:
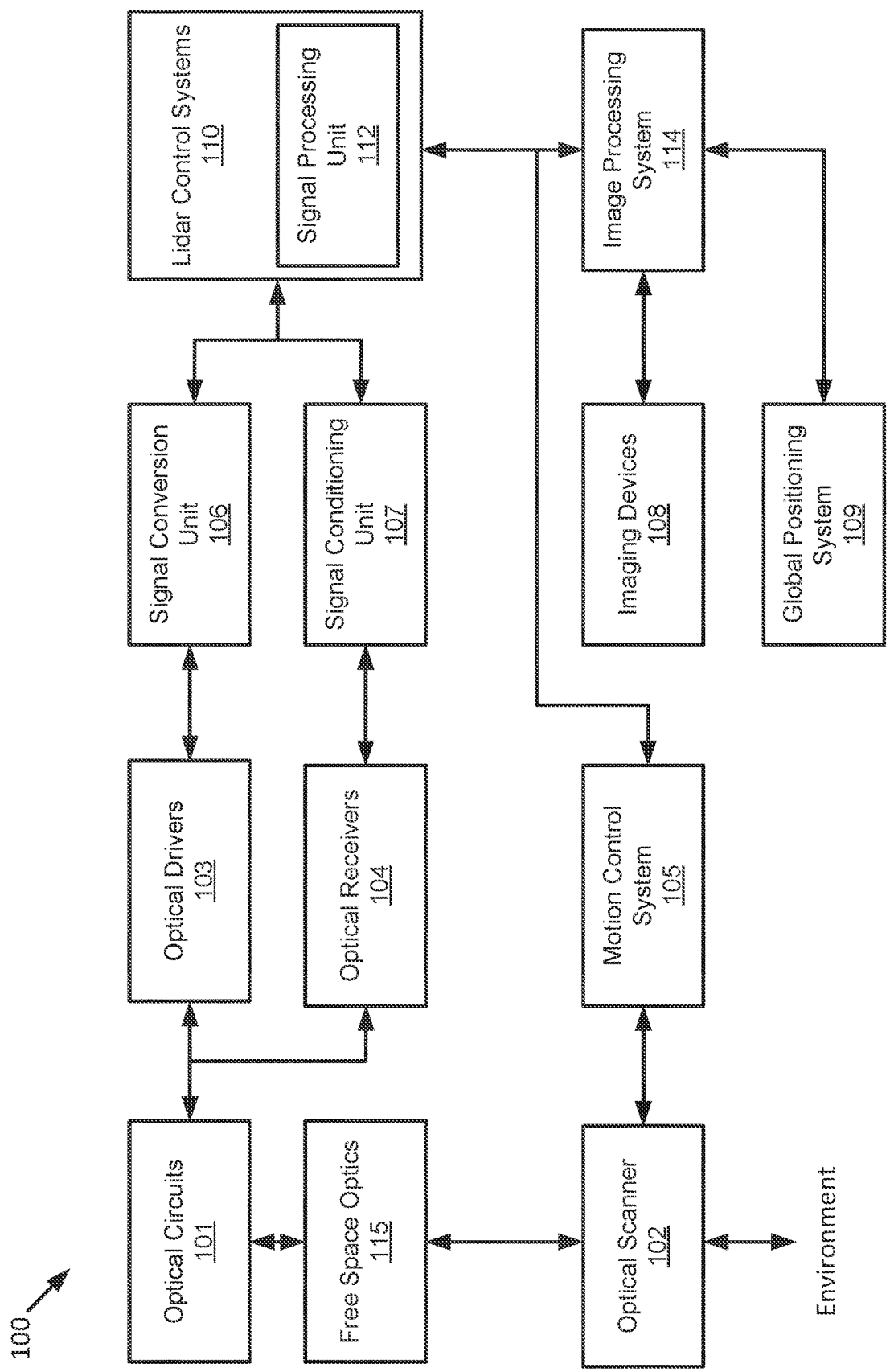
FIG. 1 is a block diagram illustrating an example LIDAR system according to the present disclosure.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. The optical scanner 102 also collects light incident upon any objects in the environment into a return optical beam that is returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like. In some examples, the LIDAR control systems 110 may include memory to store data, and instructions to be executed by processing devices described herein. The memory may be, for example, read-only memory (ROM), random-access memory (RAM, programmable read-only memory (PROM), erasable programmable read-only memory (EPROM), electrically erasable programmable read-only memory (EEPROM), flash memory, magnetic disk memory such hard disk drives (HDD), optical disk memory such as compact-disk read-only (CD-ROM) and compact disk read-write memory (CD-RW), or any other type of non-transitory memory.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use non-degenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
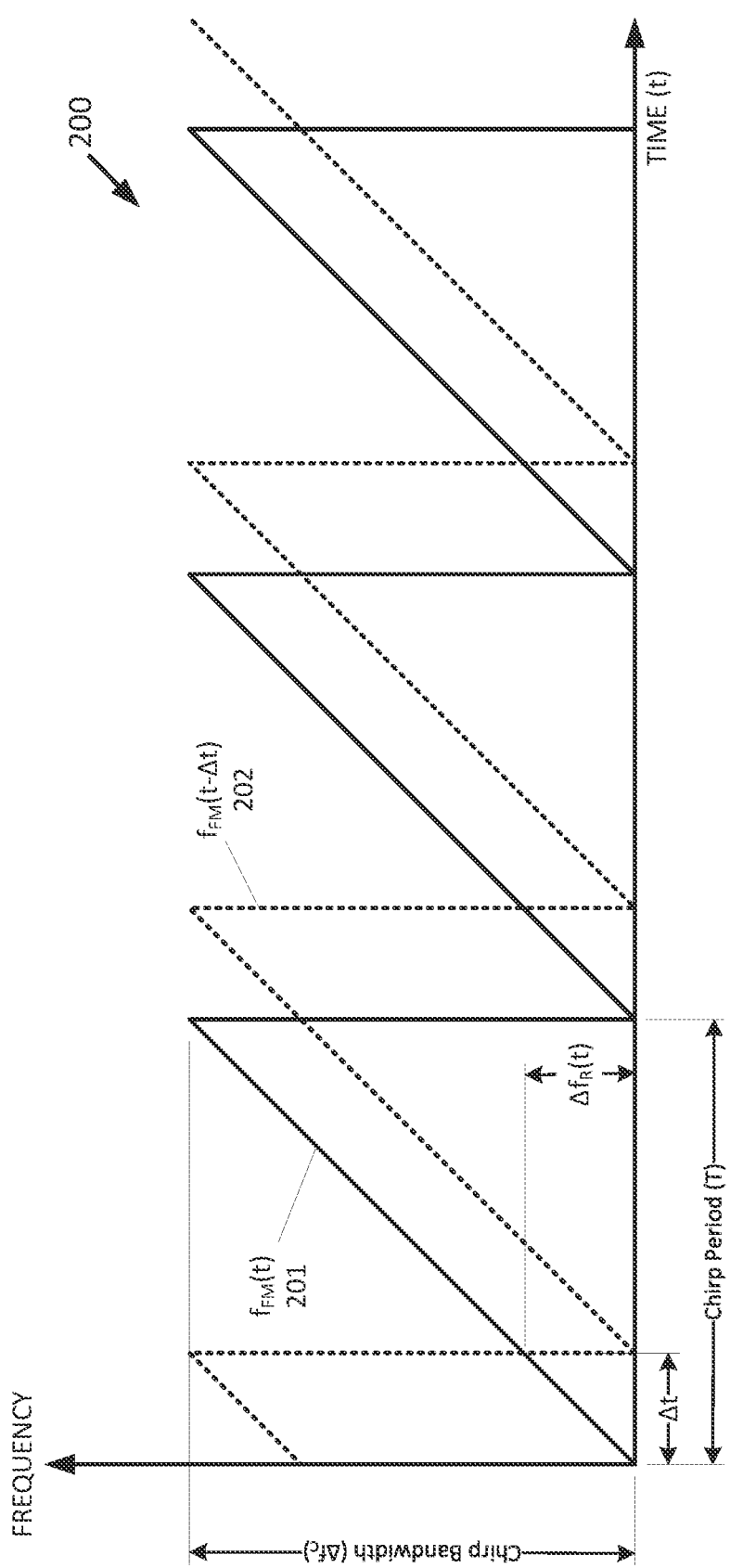
FIG. 2 is a time-frequency diagram illustrating one example of LIDAR waveforms according to the present disclosure.

FIG. 2 is a time-frequency diagram 200 of an FMCW scanning signal 201 that can be used by a LIDAR system, such as system 100, to scan a target environment according to some embodiments. In one example, the scanning waveform 201, labeled as $f_{FM}(t)$, is a sawtooth waveform (sawtooth "chirp") with a chirp bandwidth $\Delta f_C$ and a chirp period $T_C$. The slope of the sawtooth is given as $k=(\Delta f_C/T_C)$.

FIG. 2 also depicts target return signal 202 according to some embodiments. Target return signal 202, labeled as $f_{FM}(t-\Delta t)$, is a time-delayed version of the scanning signal 201, where $\Delta t$ is the round trip time to and from a target illuminated by scanning signal 201. The round trip time is given as $\Delta t = 2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta f_R(t)$ is generated. The beat frequency $\Delta f_R(t)$ is linearly related to the time delay $\Delta t$ by the slope of the sawtooth k. That is, $\Delta f_R(t)=k\Delta t$. Since the target range R is proportional to $\Delta t$, the target range R can be calculated as $R=(c/2)(\Delta f_R(t)/k)$. That is, the range R is linearly related to the beat frequency $\Delta f_R(t)$. The beat frequency $\Delta f_R(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR scanning system 100. The digitized beat frequency signal can then be digitally processed, for example, in a signal processing unit, such as signal processing unit 112 in system 100. It should be noted that the target return signal 202 will, in general, also include a frequency offset (Doppler shift) if the target has a velocity relative to the LIDAR scanning system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta f_{Rmax}$) is 500 megahertz. This limit in turn determines the maximum range of the system as $R_{max}=(c/2)(\Delta f_{Rmax}/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number full rotations in azimuth by the optical scanner.

Figure 3:
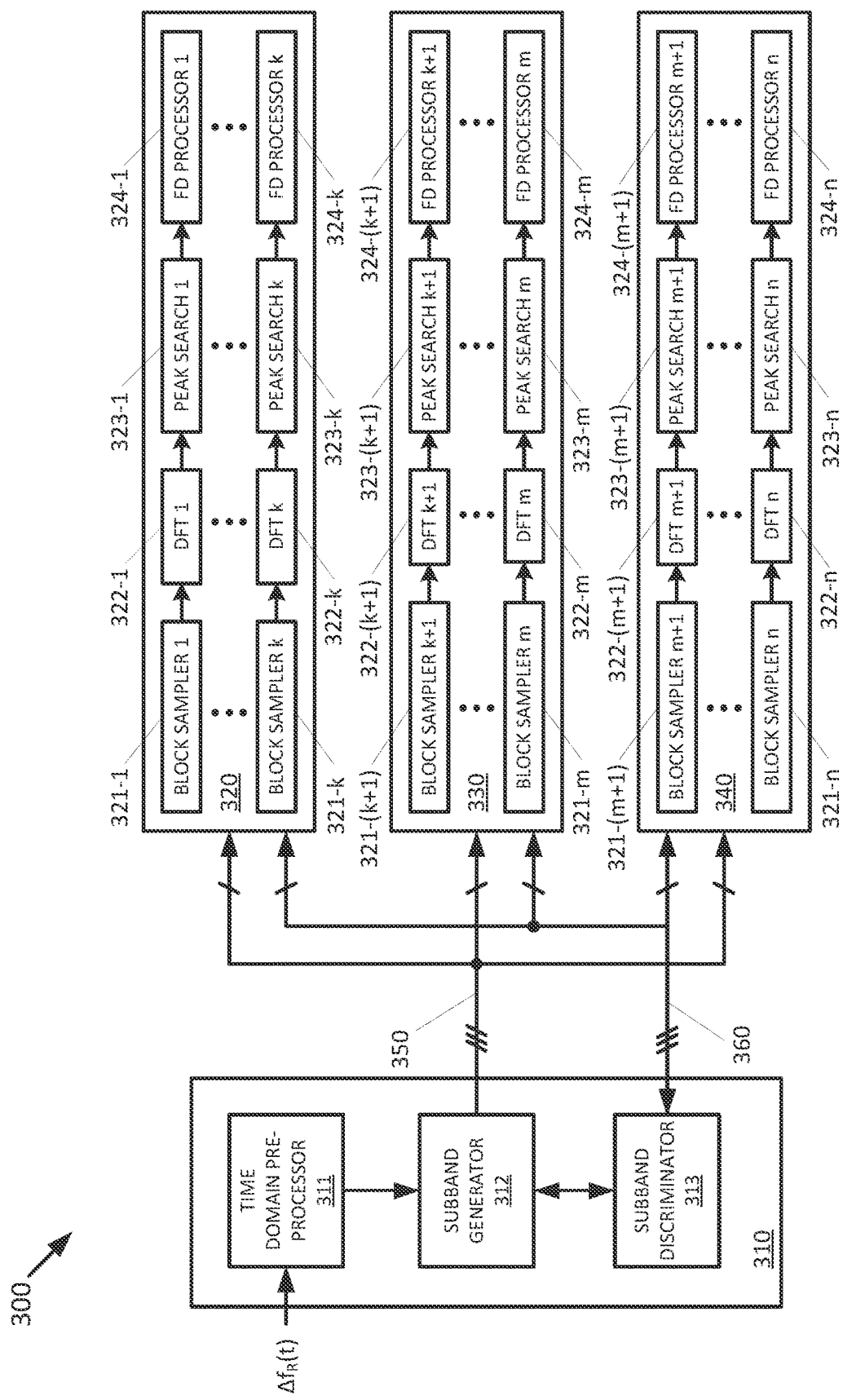
FIG. 3 is a block diagram illustrating an example LIDAR system using selective subband processing in the time domain and the frequency domain according to the present disclosure.

FIG. 3 is a block diagram of an example signal processing system 300 using selective time domain and frequency domain processing to enhance the detectability of distant targets and to improve the range and angular resolution of close targets. System 300 may be, for example, a subsystem or component of signal processing unit 112 of LIDAR system 100. System 300 may be implemented in hardware, firmware, software, or some combination of hardware, firmware and software.

In one example, signal processing system 300 includes a time domain processing subsystem 310, a subband processor 320 to process one or more subbands of a first type, a subband processor 330 to process one or more subbands of a second type, and a subband processor 340 to process one or more subbands of a third type.

In one example, time domain processing subsystem 310 is configured to receive a continuous stream of digitized samples of a range-dependent time domain baseband signal $\Delta f_R(t)$ in a frequency modulated continuous wave (FMCW) LIDAR system, such as system 100, to separate the baseband signal into frequency subbands in the time domain based on subband typing criteria, and to select subband processing parameters for the frequency subbands in the time domain and the frequency domain based on the subband typing criteria.

In one example, the time domain processing subsystem 310 includes a time domain pre-processor 311 to condition the samples of the range-dependent baseband signal. Examples of signal conditioning include, without limitation, band limiting and band shaping such as Hamming or Hann windowing to reduce noise and unwanted signal conversion artifacts in subsequent signal processing operations such as time to frequency conversion. The pre-conditioned time domain samples are then provided to subband generator 312 that generates N frequency-limited time domain subbands (where N is an integer greater than 1) with up to N different center frequencies and N different bandwidths, where the subbands may be overlapping or non-overlapping, The subbands may cover the full spectrum of the baseband signal from 0 to $\Delta f_{Rmax}$, where lower frequency subbands correspond to targets that are close to the LIDAR system 100 and higher frequency subbands correspond to targets that are further from the LIDAR system 100.

In general, the low frequency subbands from close targets contain high energy signals that are easy to detect, while the high frequency subbands from distant targets contain low energy signals (due to signal dispersion and path loss) and are more difficult to detect. Additionally, targets that are close to the LIDAR system 100 require higher range and angle resolution than distant targets, because their proximity in distance corresponds to proximity in time, and the LIDAR system 100 must be able to accurately track and avoid those targets.

Subbands may be classified according to type. In one example, a first type of subband (Type 1) may include subbands containing frequencies that are less than a predetermined low frequency threshold corresponding to a maximum near-range target distance, a second type of subband (Type 2) may include subbands containing frequencies greater than a predetermined high frequency threshold corresponding to a minimum far-range target distance, and a third type of subband (Type 3) may include subbands containing frequencies between the low frequency threshold and the high frequency threshold corresponding to mid-range target distances. Subbands within each type of subband processor may have fixed or variable bandwidths and may be overlapping or non-overlapping, and fixed or variable center frequencies. Metrics other than frequency, or in addition to frequency, may be used to define subbands. For example, subbands may be defined by peak or average signal energy or peak or average signal-to-noise ratio. Metrics may also include information about where the targets are located in azimuth and elevation, and the angular and radial velocities of targets based on preceding scans. It will be appreciated that the use of three subband processors in the example of system 300 is only for ease of explanation and example, and is not intended to be limiting.

FIG. 4 is a block diagram of an example time domain subband generator 400 that can generate time domain subbands like those described above with respect to time domain subband generator 312, according to some embodiments. Subband generator 400 includes a bank 401 of N downconverters, 0 through (N−1), to convert the input signal $\Delta f_R(t)$ to N different center frequencies, corresponding to the N subbands. The downconverter signals are then bandlimited and downsampled by a bank 402 of N filter and downsamplers to generate N subbands 0 through N−1. Overlapping subbands may be created by adjusting the downconverter frequencies and filter bandwidths. In some examples, the center frequencies of the subbands may be uniformly spaced and the bandwidths of the N subbands may all be the same. In other examples, the center frequencies of the subbands may be spaced non-uniformly (e.g., increased spacing with increasing frequency) and the bandwidths of the subbands may be non-uniform (e.g., increasing with the center frequency of the subband).

FIG. 5 is a block diagram of an example time domain subband generator 500 that can generate uniform or non-uniform time domain subbands as described above with respect to time domain subband generator 312, according to some embodiments. Subband generator 500 includes a 1:N downsampler 501 that receives the sampled input signal $\Delta f_R(t)$ and distributes the input signal to filter bank 502, such that FILTER 0 receives samples 0, N, 2N, . . . , FILTER 1 receives samples 1, N+1, 2N+1, . . . , etc. The center frequencies of the filters in the filter bank 502 may be spaced uniformly or non-uniformly and have uniform or non-uniform bandwidths as described with respect to subband generator 400. The outputs of the filter bank 502 are fed to a discrete Fourier transform engine 503, which may perform a fast Fourier transform (FFT).

While the frequency content of the baseband signal may include energy at all frequencies from zero to a maximum frequency $\Delta f_{R_{max}}$, corresponding to the maximum range of the LIDAR system 100, not all frequencies may be present due to the absence of targets at the corresponding ranges. FIGS. 6A, 6B and 6C illustrate examples of different ways of generating subbands, where the baseband signal energy is limited to three subbands, according to some embodiments. FIG. 6A illustrates a spectrum 601 for the simplest case where the subbands have uniform bandwidth and are non-overlapping, and signal energy is limited to subbands n−1, n, and n+1 (where 0<n<N). FIG. 6B illustrates a spectrum 602 for the case of uniform bandwidths with uniform overlaps, which may be used to avoid the loss of performance at the edges of the subbands. FIG. 6C illustrates a spectrum 603 for a third case where the subbands have non-uniform bandwidths and non-uniform overlaps, which can reduce processing overhead compared to FIG. 6B.

Returning to FIG. 3, subband generator 312 may be configured to provide Type 1 subbands to the Type 1 subband processor 320, Type 2 subbands to the Type 2 subband processor 330, and Type 3 subbands to the Type 3 subband processor 340. Additionally, the time domain processing subsystem 310 may also include a subband discriminator 313 to detect the subbands produced by subband generator 312 and to select processing parameters for the subbands in subband processors 320 and 330 in the time domain and the frequency domain based on the subband types and additional subband typing criteria. In addition to frequency, subband typing criteria may include, without limitation, peak or average signal energy and/or peak or average signal-to-noise ratio. In other examples, the subband typing criteria may also include characteristics of the target environment (scene characteristics) such as density of targets, relative radial target velocity (EGO velocity) derived from Doppler shift, angular velocity, location in the scanned field of view (FOV) based on azimuth angle and elevation angle, and the predicted location of targets based on previous scans.

As described above, Type 1 subbands are coupled to Type 1 subband processor 320, Type 2 subbands are coupled to Type 2 subband processor 330, and Type 3 subbands are coupled to Type 3 subband processor 340. In the example of FIG. 3, Type 1 subband processor 320 includes k processing chains 1 through k, Type 2 subband processor 330 includes (m−k) processing chains k+1 through m, and Type 3 subband processor 340 includes (n−m) processing chains m+1 through n. Each processing chain in the subband processors includes a block sampler 321, a discrete Fourier transform (DFT) processor 322, a peak search processor 323, and a frequency domain (FD) processor 324. The subband processing parameters for each processing chain are controlled by the subband discriminator 313, based on the subband typing criteria, using data and control lines 340. As described below, subband processing parameters may include an adapted bandwidth of each subband, the integration time for each block sampler, the length and period of each DFT, and the length of digital filters in the frequency domain processors. The following is a description of a typical processing chain in one of the subband processors 320, 330 or 340.

In one example, a subband processor receives and processes a stream of subband samples from subband generator 312 via data lines 350, where each subband sample in the stream has a duration corresponding to the sample rate of the time domain baseband signal received by the time domain processing subsystem 310. The block sampler 321 integrates the subband samples into a time domain sample block. The integration time of the block sample is one of the subband processing parameters controlled by subband discriminator 313. For example, Type 2 subbands, high frequency subbands corresponding to long-range targets, will generally have low signal energy and low signal-to-noise ratios (SNR) due to signal dispersion and path losses. Accordingly, the integration time for high frequency subbands can be increased to pull the signal out of the noise. Conversely, in the case of lower frequency Type 1 subbands corresponding to near-range targets, signal energy and SNR will generally be higher, so the integration time can be reduced. The integration times for Type 3, mid-range subband signals will lie between the integration times for Type 1 subbands and Type 2 subbands.

The integration time of the block samplers 321 is also related to angular resolution. This is so because the optical scanner in a LIDAR system, such as optical scanner 102 in example LIDAR system 100, has a high angular velocity in azimuth (measured in degrees per second), so angular resolution is directly proportional to time. Therefore, for close-range targets with high signal energy, reducing the integration time of the block sampler also improves angular resolution.

The time domain sample blocks produced by the block samplers 321 are received by discrete Fourier transform (DFT) processors 322, which convert the time domain sample blocks to subbands in the frequency domain with a frequency resolution based on the processing parameters provide by the subband discriminator 313. Two subband processing parameters may be associated with the DFT processors 322; DFT length (i.e., number of points in the DFT) and DFT period (i.e., the duration of the DFT). For a time-domain sample block with a given integration time and a given bandwidth, a longer DFT generates smaller frequency bins and higher frequency resolution, which translates to higher range resolution in an FMCW LIDAR system. For a given DFT length, the period of the DFT will affect the angular resolution of the system because time translates to angular rotation of the scanning mirrors in the optical scanner.

FIG. 7A is a time-frequency diagram 701 illustrating the use of longer length DFTs (16-point in the example of FIG. 7A) with short duration to improve range and angle resolution as may be appropriate for low frequency signals associated with close-range targets. FIG. 7B is a time-frequency diagram 702 illustrating the use of shorter DFTs (4-point in the example of FIG. 7B) with longer durations as may be appropriate for higher frequency signals associated with long-range targets.

Each processing chain in the subband processors includes a peak search processor 323 to search each frequency bin in the output of its corresponding DFT processor 322. Each peak search processor 323 performs a search for energy peaks, signal-to-noise ratio (SNR) peaks and/or average SNR in the frequency bins that can be correlated to a target in the LIDAR system's field of view (FOV) to establish a point in a 3D LIDAR cloud model of the target environment.

Figure 8:
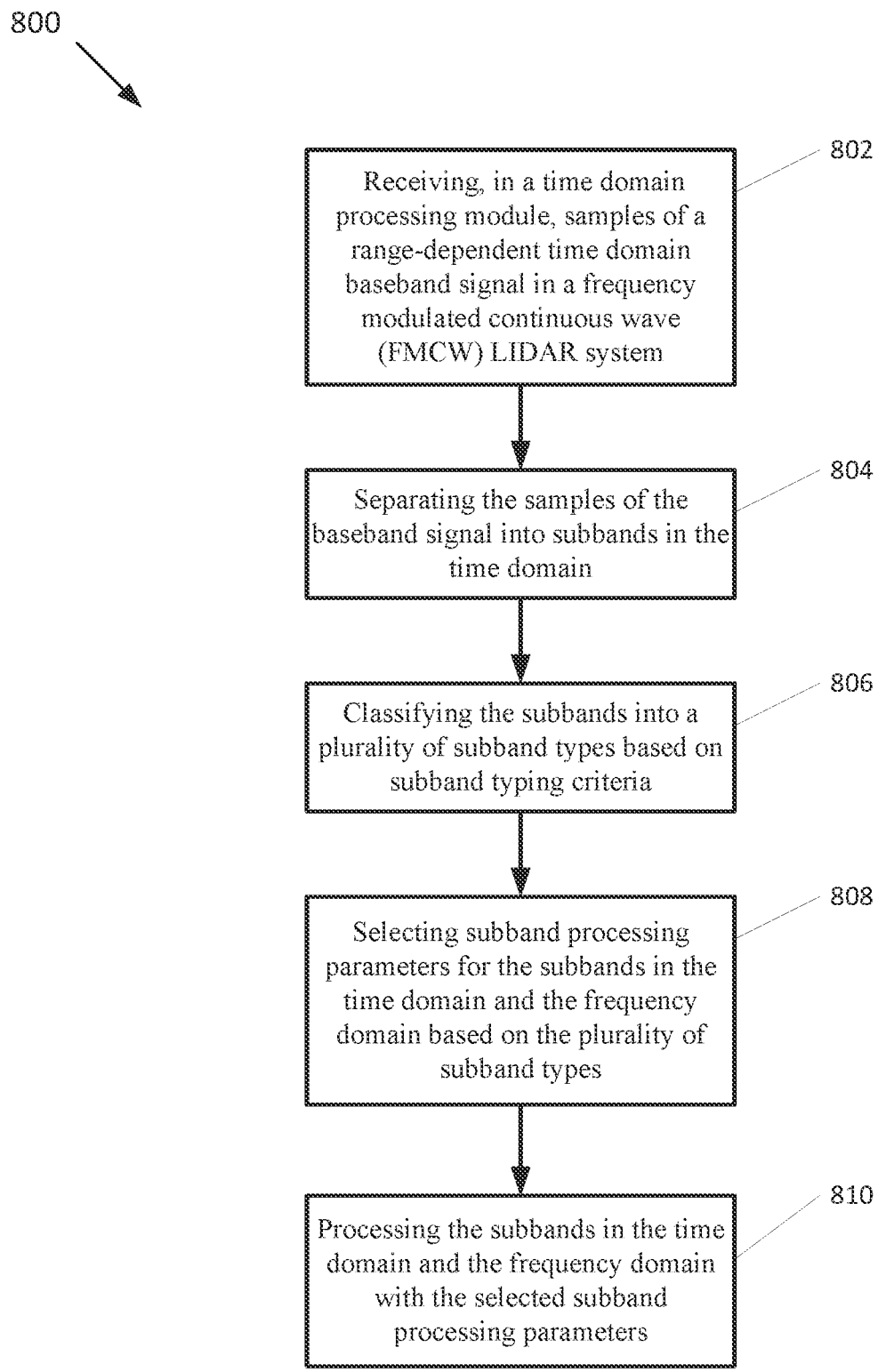
FIG. 8 is a flowchart illustrating an example method for selective subband processing in the time domain and frequency domain according to the present disclosure.

Each processing chain in the Type 1 subband processor 320 may also include a frequency domain post-processor (FD processor) 324, configured to resolve target ranges and target angles in the 3D LIDAR point cloud. Examples of post-processing may include, without limitation, resampling, time-averaging and digital filtering the frequency domain subband signals produced by the DFT processors 322. The lengths of the digital filters may be used as an additional subband processing parameter by the subband discriminator FIG. 8 is a flowchart illustrating an example method 800 that may be implemented in an FMCW LIDAR system such as system 300, for example. Method 800 begins at operation 802, receiving, in a time domain processing component (e.g., time domain processing component 310), samples of a range-dependent time domain baseband signal in a frequency modulated continuous wave (FMCW) LIDAR system. Method 800 continues at operation 804, separating the samples of the baseband signal into subbands in the time domain (e.g., in subband generator 312). Method 800 continues at operation 806, classifying the subbands into a plurality of subband types based on subband typing criteria (e.g., in subband discriminator 313). Method 800 continues at operation 808, selecting subband processing parameters for the subbands in the time domain and the frequency domain based on the plurality of subband types (e.g., in subband discriminator 313). Method 800 concludes at operation 810, processing the subbands in the time domain and the frequency domain with the selected subband processing parameters (e.g., in block sampler 321, DFT processors 322, in peak search processors 323, and in frequency domain processors 324).

Figure 9:
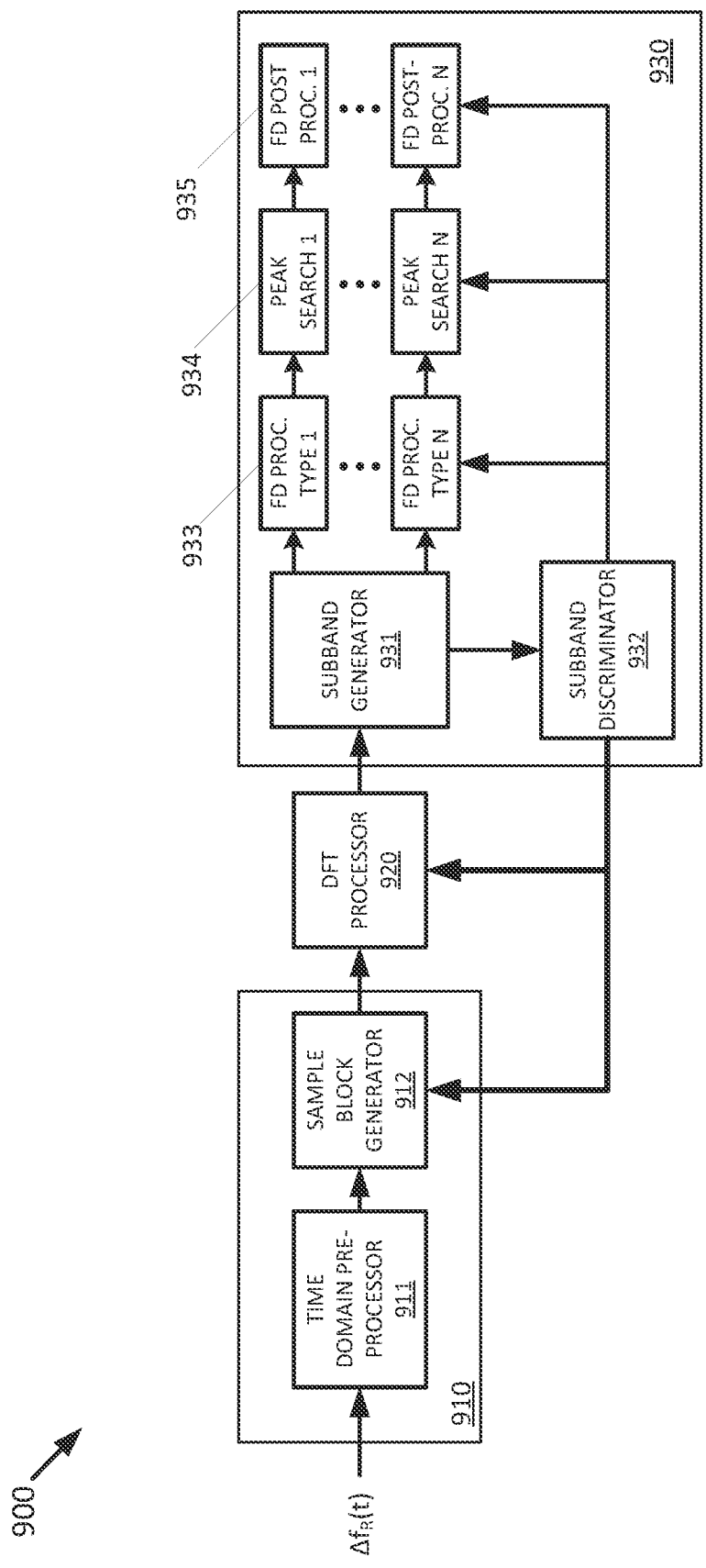
FIG. 9 is a block diagram illustrating an example LIDAR system using selective subband processing in the frequency domain according to the present disclosure.

FIG. 9 is a block diagram illustrating an example signal processing system 900 using selective signal processing in the frequency domain to classify subbands according to subband typing criteria, and processing the subbands with selected subband processing parameters based on the subband typing criteria. System 900 may be, for example, a subsystem or component of signal processing unit 112 of LIDAR system 100. System 900 may be implemented in hardware, firmware, software, or some combination of hardware, firmware and software.

In one example, system 900 includes a time domain processing subsystem 910 to receive samples of a range-dependent time domain baseband signal in a frequency modulated continuous wave (FMCW) light detection and ranging (LIDAR) system, to pre-condition the samples, and to assemble the pre-conditioned samples into time domain sample blocks. Example system 900 also includes a discrete Fourier transform (DFT) processor 920 coupled with the time domain processing component 910 to convert the time domain sample blocks into frequency components (subbands) of the time domain baseband signal. Example system 900 also includes a frequency domain processing subsystem coupled with the DFT processor to generate subbands in the frequency domain, to classify the subbands by type, and to process each subband using selected subband processing parameters based on the subband type.

In one example, the time domain processing subsystem 910 includes a time domain pre-processor 911 to condition the samples of the range-dependent baseband signal. Time domain preprocessor 911 may be similar to the time domain preprocessor 311 in system 300 described above.

The pre-conditioned time domain samples are then provided to a sample block generator 912 that integrates the samples into sample blocks in the time domain as described above with respect to block samplers 321 in system 300, where the integration time is a selected processing parameter based on the subband typing criteria described above with respect to system 300.

The sample blocks from sample block generator 912 are provided to DFT processor 920, which converts the time domain sample blocks to subbands in the frequency domain. The length and period of the DFT may also be selected subband processing parameters based on the subband typing criteria. In one example, DFT processor 920 may be configured to convert the time domain block samples to the full spectrum of the baseband signal. For example, and without limitation, if the baseband spectrum covers 0 Hertz (Hz) to 500 Megahertz (MHz), then the required Nyquist sample rate in the time domain will be 1 Gigahertz (GHz) to avoid aliasing. If the DFT processor performs a 32 point DFT, then the output of the DFT processor will be 16 frequency bins spanning 500 MHz, where each frequency bin individually spans 31.25 MHz.

The output of the DFT processor 920 is provided to frequency domain processing subsystem 930. Frequency domain processing subsystem 930 includes a subband generator 931 to generate subbands in the frequency domain. Subband generator 931 may be configured to generate N subbands in the frequency domain, similar to subband generator 312 in system 300 described above. The center frequencies and bandwidths of the subbands may also be selected subband processing parameters based on the subband typing criteria. Subband generator 931 may upsample or downsample the output of DFT processor 920.

Frequency domain processing subsystem 930 also includes a subband discriminator 932 coupled with the subband generator 931, the sample block generator 912 and the DFT processor 920, to classify the subbands by type based on the subband typing criteria, and to select the subband processing parameters for each subband in the frequency domain based on the subband type.

Figure 10:
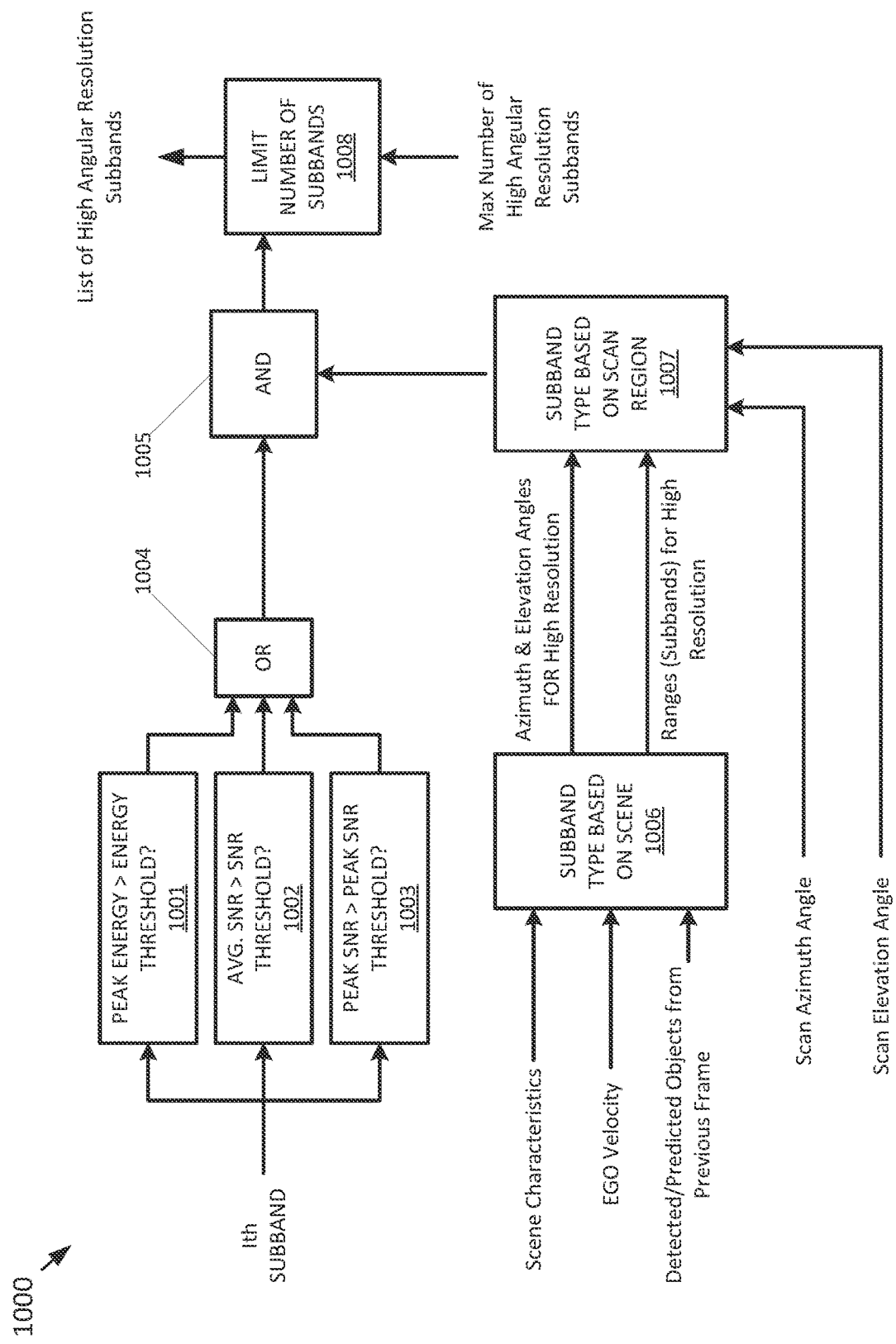
FIG. 10 is block diagram illustrating a subband discriminator according to the present disclosure.

FIG. 10 is a flowchart illustrating an example algorithm 1000 that may be used by subband discriminator 932 for classifying subbands for selective processing according to some embodiments. For each subband, subband discriminator 932 determines if the peak energy in the subband is greater than a predetermined energy threshold in operation 1001, if the average SNR in the subband is greater than a predetermined SNR threshold in operation 1002, or if the peak SNR in the subband is greater than a predetermined peak SNR threshold in operation 1003. If any of these conditions is satisfied, then the OR operation 1004 selects the subband for further consideration and processing.

In parallel, in operation 1006, the subband discriminator 932 processes scene information to determine any critical azimuth or elevation angles requiring enhanced angle resolution and any ranges requiring enhanced range resolution. The scene information may include, without limitation, scene characteristics (e.g., general target density), velocity of targets, and the detection or prediction of targets from previous LIDAR scan frames.

Any critical azimuth or elevation angles requiring high angle resolution, and any critical ranges (subband frequencies) requiring high range resolution are compared with real time azimuth and elevation angles in operation 1007 to classify the subband based on the current region of the scan. This result is logically AND'ed in operation 1005 with the result of the OR operation 1004 to classify the subband. Next, in operation 1008, the number of critical (i.e., high resolution) subbands is capped at a maximum number determined, for example, by system processing capacity, and prioritized based on criticality (e.g., collision avoidance). The output of operation 1008 is the subband processing parameters used in the subband processing chains in frequency domain processing component 930.

Returning to FIG. 9, frequency domain processing subsystem 930 also includes N frequency domain processing chains, coupled with the subband generator 931 and the subband discriminator 932, to condition each subband, to detect energy peaks or signal-to-noise ratio (SNR) peaks in each subband, and to resolve a target range and resolve a target angle in each subband with a detectable energy peak or SNR peak.

Each frequency domain processing chain includes a frequency domain (FD) pre-processor 933-$n$ (where $1 \leq n \leq N$) to selectively filter the subband based on subband type, a peak search processor 934-$n$ coupled with the FD pre-processor 933-$n$ to selectively search for energy peaks based on the subband type, and a frequency domain (FD) post-processor 935-$n$ to selectively filter points in the three-dimensional (3D) LIDAR point cloud to remove noise based on subband type. Processing parameters for these operations, such as the lengths of digital filters for pre and post-processing, may be chosen by subband discriminator 932 based on the subband typing criteria.

In one example, for frequency subbands containing frequencies less than a specified upper frequency threshold, the FD pre-processors 933-$n$ include a filter with a bandwidth less than or equal to a bandwidth of the frequency subband, the peak search processors 934-$n$ include a peak search engine having a detection threshold greater than a predetermined lower threshold, and the frequency domain (FD) post-processors 935-$n$ include a point cloud filter having a noise rejection threshold greater than a predetermined upper threshold.

Figure 11:
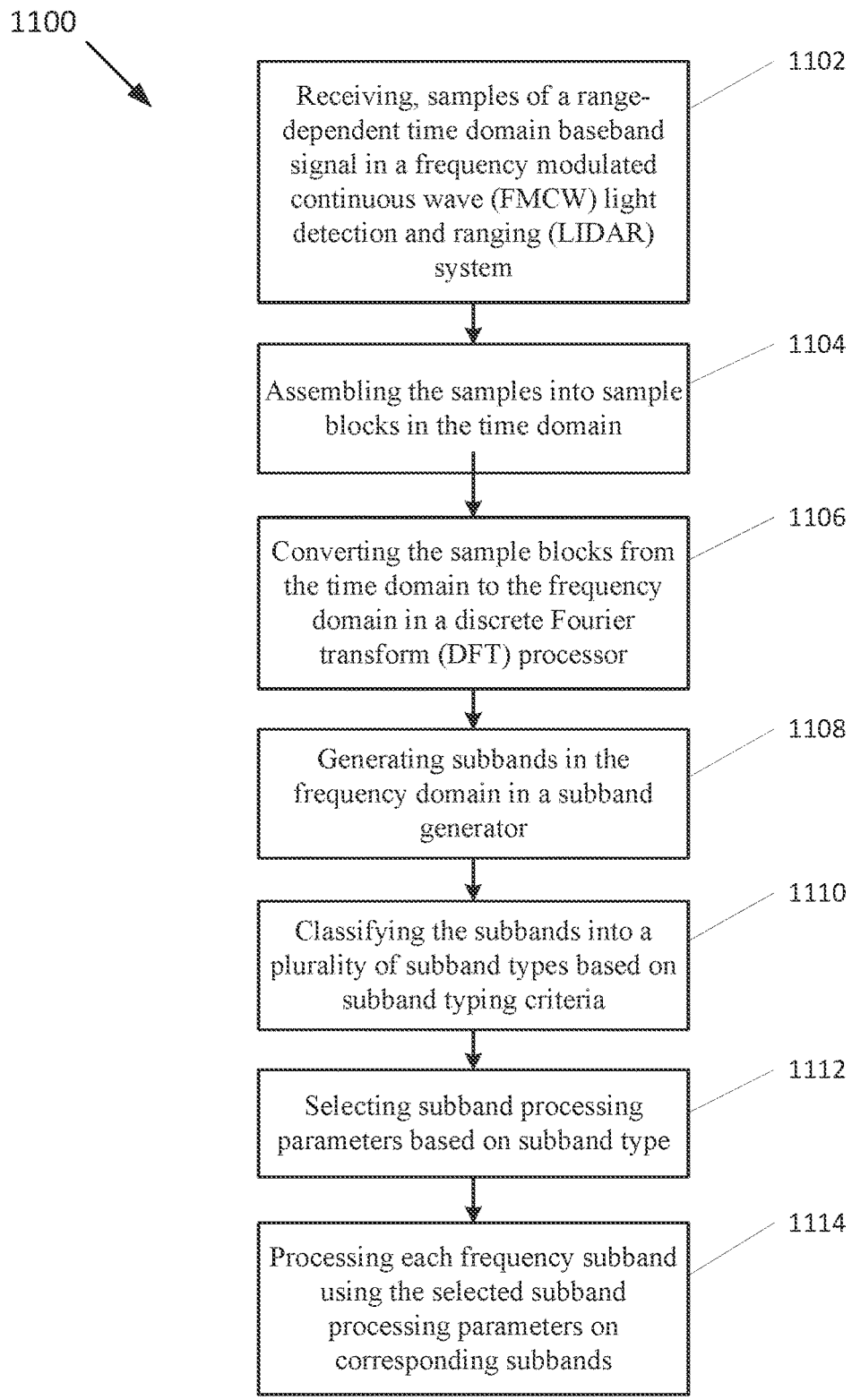
FIG. 11 is a flowchart illustrating an example method for selective subband processing in the frequency domain according to the present disclosure.

FIG. 11 is a flowchart illustrating an example method 1100 for selectively processing subbands, that may be implemented in an FMCW LIDAR system such as system 900. Method 1100 begins at operation 1102, receiving, in a time domain processing subsystem (e.g., subsystem 910), samples of a range-dependent time domain baseband signal. Method 1100 continues at operation 1104, assembling the samples into sample blocks (e.g., integrating the samples in sample block generator 912) in the time domain. Next, method 1100 continues in operation 1106 by converting the sample blocks from the time domain to the frequency domain in a discrete Fourier transform (DFT) processor (e.g., DFT processor 920). In operation 1108, method 1100 continues by generating subbands in the frequency domain (e.g., in subband generator 931). In operation 1110, method 1100 continues by classifying the subbands into a plurality of subband types based on subband typing criteria (e.g., in subband discriminator 932). Method 100 continues at operation 1112, selecting subband processing parameters (e.g., subband bandwidths and frequencies, integration times, DFT length and period, and digital filter lengths) based on subband type (e.g., by subband discriminator 932). Method 1100 concludes with operation 1114, processing each frequency subband (e.g., in processing chains 933-n, 934-$n$ and 935-$n$) using the selected subband processing parameters (e.g., from subband discriminator 932) on corresponding subbands.

Figure 12:
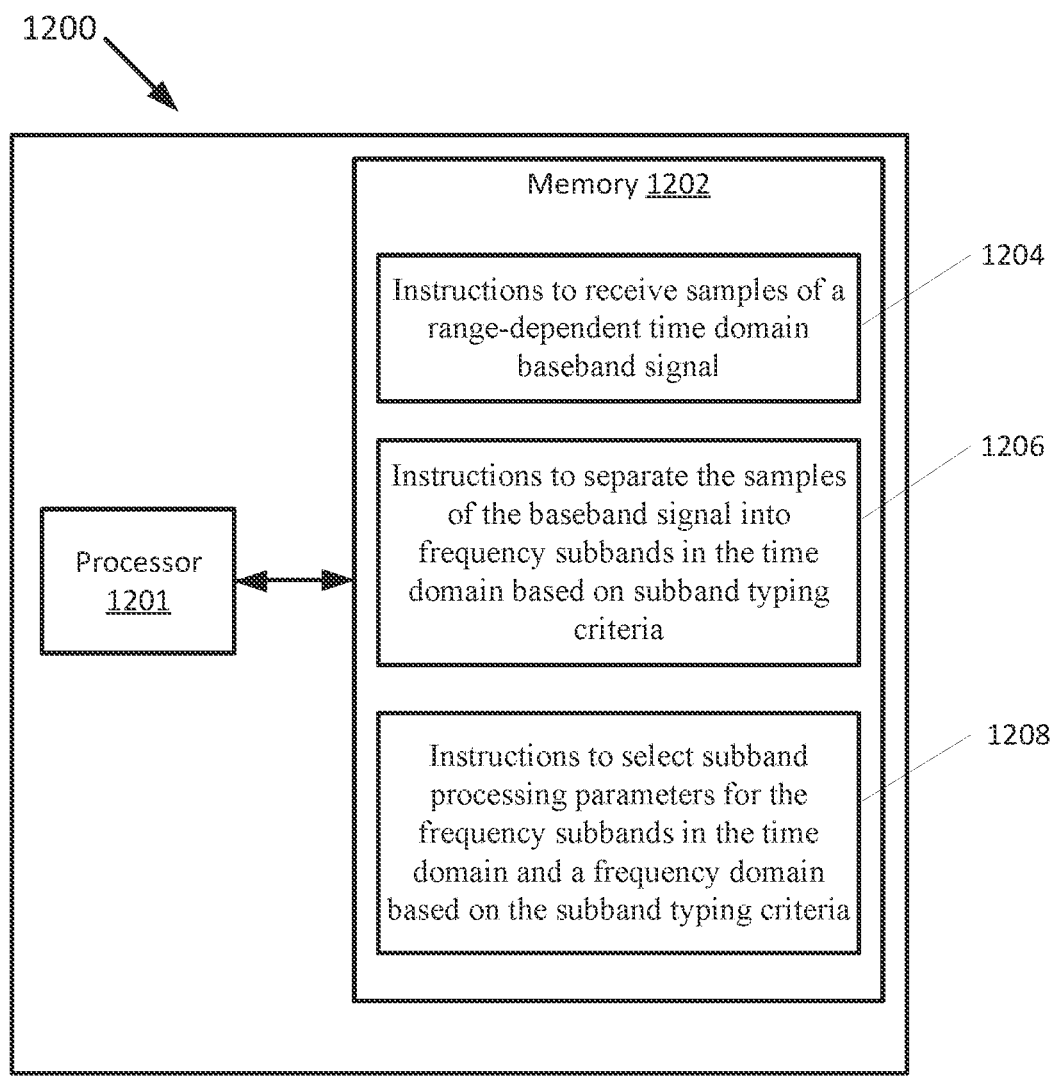
FIG. 12 is a block diagram illustrating an example processing system according to the present disclosure.

FIG. 12 is a block diagram illustrating an example processing system 1200 for selectively processing frequency subbands in a LIDAR system according to embodiments of the present disclosure. Processing system 1200 may include components that are the same or similar to components of signal conditioning unit 107 and signal processing unit 112 in LIDAR system 100. Processing system 1200 includes a processor 1201, which may be any type of general purpose processing device or special purpose processing device designed for use in the LIDAR system. Processing device 1201 is coupled with a memory 1202, which can be any type of non-transitory computer-readable medium (e.g., RAM, ROM, PROM, EPROM, EEPROM, flash memory, magnetic disk memory or optical disk memory) containing instructions that, when executed by processor 1201, cause the LIDAR system to perform the method 1100 described herein. In particular, memory 1202 includes instructions 1204 to receive samples of a range-dependent time domain baseband signal (e.g., in time domain processing module 310); instructions 1206 to separate the samples of the baseband signal into frequency subbands in the time domain based on subband typing criteria (e.g., in time domain processing module 310); and instructions 1208 to select subband processing parameters for the frequency subbands in the time domain and a frequency domain based on the subband typing criteria (e.g., in subband processors 320, 330 and 340).

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous wave (FMCW) light detection and ranging (LIDAR) system, comprising:
   a processor;
   a memory to store instructions that, when executed by the processor, cause the system to:
     receive samples of a range-dependent time domain baseband signal;
     assemble the samples into sample blocks in the time domain;
     convert the sample blocks from the time domain to the frequency domain;
     generate subbands in the frequency domain from converted sample blocks;
     classify the subbands into a plurality of subband types based on subband typing criteria;
     select subband processing parameters for each of the subbands based on respective ones of the plurality of subband types; and
     process each of the subbands using the selected subband processing parameters for the subband.

2. The FMCW LIDAR system of claim 1, wherein, to convert the sample blocks from the time domain to the frequency domain, the system is further to:
   perform a discrete Fourier transform (DFT) using a DFT processor.

3. The FMCW LIDAR system of claim 2, wherein a length of the DFT is based on a range resolution associated with each subband type, and wherein a frequency of the DFT is based on an angular resolution associated with each subband type.

4. The FMCW LIDAR system of claim 1, wherein the subband typing criteria for a respective subband are based on one or more of a peak signal energy in the respective subband, an average signal-to-noise ratio in the respective subband, a peak signal-to-noise ratio in the respective subband, a scene characteristic, a target velocity relative to the LIDAR system, an azimuth scan angle, or an elevation scan angle.

5. The FMCW LIDAR system of claim 1, wherein a first subband type of the plurality of subband types is based on a comparison of a characteristic of a respective subband of the subbands to a characteristic threshold corresponding to a predefined close-range target, and wherein a second subband type of the plurality of subband types is based on a comparison of the characteristic of the respective subband to a second characteristic threshold corresponding to a predefined long-range target.

6. The FMCW LIDAR system of claim 5, wherein the characteristic is one of a frequency of the respective subband, a peak energy of the respective subband, a peak signal-to-noise ratio (SNR) of the respective subband or an average signal-to-noise ratio (SNR) of the respective subband.

7. The FMCW LIDAR system of claim 1, wherein, to process each of the subbands using the selected subband processing parameters for the subband, the system is further to:
   filter each of the subbands with a digital filter, wherein a length of the digital filter is based on the subband type of the subband.

8. A method in a frequency modulated continuous wave (FMCW) light detection and ranging (LIDAR) system, comprising:
   receiving samples of a range-dependent time domain baseband signal;
   assembling the samples into sample blocks in the time domain;
   converting the sample blocks from the time domain to the frequency domain;
   generating subbands in the frequency domain from converted sample blocks;
   classifying the subbands into a plurality of subband types based on subband typing criteria;
   selecting subband processing parameters for each of the subbands based on respective ones of the plurality of subband types; and
   processing each of the subbands using the selected subband processing parameters for the subband.

9. The method of claim 8, wherein converting the sample blocks from the time domain to the frequency domain is performed using a discrete Fourier transform (DFT) using a DFT processor.

10. The method of claim 9, wherein a length of the DFT is based on a range resolution associated with each subband type, and wherein a frequency of the DFT is based on an angular resolution associated with each subband type.

11. The method of claim 8, wherein the subband typing criteria for a respective subband are based on one or more of a peak signal energy in the respective subband, an average signal-to-noise ratio in the respective subband, a peak signal-to-noise ratio in the respective subband, a scene characteristic, a target velocity relative to the LIDAR system, an azimuth scan angle, or an elevation scan angle.

12. The method of claim 8, wherein a first subband type of the plurality of subband types is based on a comparison of a characteristic of a respective subband of the subbands to a characteristic threshold corresponding to a predefined close-range target, and wherein a second subband type of the plurality of subband types is based on a comparison of the characteristic of the respective subband to a second characteristic threshold corresponding to a predefined long-range target.

13. The method of claim 12, wherein the characteristic is one of a frequency of the respective subband, a peak energy of the respective subband, a peak signal-to-noise ratio (SNR) of the respective subband or an average signal-to-noise ratio (SNR) of the respective subband.

14. The method of claim 8, wherein processing each of the subbands using the selected subband processing parameters for the subband comprises:
    filtering each of the subbands with a digital filter, wherein a length of the digital filter is based on the subband type of the subband.

15. A non-transitory computer-readable storage medium comprising instructions that, when executed by a processor in a frequency modulated continuous wave (FMCW) light detection and ranging (LIDAR) system, cause the LIDAR system to:
    receive samples of a range-dependent time domain baseband signal;
    assemble the samples into sample blocks in the time domain;
    convert the sample blocks from the time domain to the frequency domain;
    generate subbands in the frequency domain from converted sample blocks;
    classify the subbands into a plurality of subband types based on subband typing criteria;
    select subband processing parameters for each of the subbands based on respective ones of the plurality of subband types; and
    process each of the subbands using the selected subband processing parameters for the subband.

16. The non-transitory computer-readable storage medium of claim 15, wherein, to convert the sample blocks from the time domain to the frequency domain, the system is further to:
    perform a discrete Fourier transform (DFT) using a DFT processor.

17. The non-transitory computer-readable storage medium of claim 15, wherein the subband typing criteria for a respective subband are based on one or more of a peak signal energy in the respective subband, an average signal-to-noise ratio in the respective subband, a peak signal-to-noise ratio in the respective subband, a scene characteristic, a target velocity relative to the LIDAR system, an azimuth scan angle, or an elevation scan angle.

18. The non-transitory computer-readable storage medium of claim 15, wherein first subband type of the plurality of subband types is based on a comparison of a characteristic of a respective subband of the subbands to a characteristic threshold corresponding to a predefined close-range target, and wherein a second subband type of the plurality of subband types is based on a comparison of the characteristic of the respective subband to a second characteristic threshold corresponding to a predefined long-range target.

19. The non-transitory computer-readable storage medium of claim 18, wherein the characteristic is one of a frequency of the respective subband, a peak energy of the respectiv subband, a peak signal-to-noise ratio (SNR) of the respective subband or an average signal-to-noise ratio (SNR) of the respective subband.

20. The non-transitory computer-readable storage medium of claim 15, wherein, to process each of the subbands using the selected subband processing parameters for the subband, the system is further to:
    filter each of the subbands with a digital filter, wherein a length of the digital filter is based on the subband type of the subband.

* * * * *